D. T. ROBINSON.
Lamp Wick.
No. 110,591.
Patented Dec. 27, 1870.
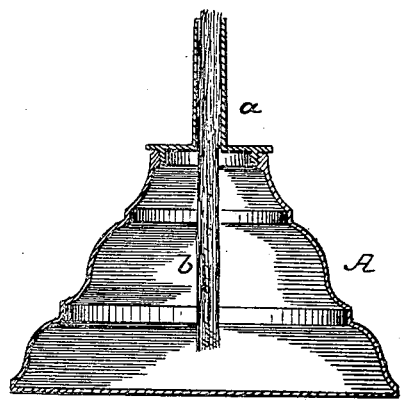
Witnesses.
Edward Griffith
P. C. Headley.
Inventor
Daniel T. Robinson
by his Attorney.
Frederick Curtis

United States Patent Office.

DANIEL T. ROBINSON, OF BOSTON, MASSACHUSETTS.

Letters Patent No. 110,591, dated December 27, 1870.

IMPROVEMENT IN LAMP-WICKS.

The Schedule referred to in these Letters Patent and making part of the same.

*To all to whom these presents shall come:*

Be it known that I, DANIEL T. ROBINSON, of Boston, in the county of Suffolk and State of Massachusetts, have made a new and useful invention of a Non-Inflammable and Indestructible Wick for Lamps; and do hereby declare the following to be a full, clear, and exact description thereof, due reference being had to the accompanying drawing making part of this specification, and which is a section of a lamp containing my invention.

The purpose of this invention is to produce a lamp-wick which shall be non-inflammable and indestructible, by which I am enabled to dispense with the necessity of trimming wick, and, perhaps, to abolish the use of devices for elevating the same, the element of economy which my invention possesses in dispensing with ordinary wicks being a matter of considerable moment.

In order to effect my purpose, I have experimented with various mineral substances, and have finally selected mica as possessing considerable capillary attraction, with stability and durability, and the requisite immunity from injury by heat.

The thin laminæ of mica render this substance, to a considerable extent, porous, and, by rolling or doubling a thin sheet until the requisite bulk has been obtained, I produce a wick for lamps which, in practice, has been found to possess sufficient absorbing powers to raise the fluid with which it is used.

The accompanying drawing represents, at A, a lamp of ordinary construction, within the wick-tube *a* of which a roll of mica is inserted as a wick, as shown at *b*.

I do not profess to have fully developed the best mode of proceeding to construct a wick of mica, but have found that a round wick, as shown in the drawing, operates satisfactorily.

For a flat wick, the ordinary kerosene lamp-burner may admit too great a quantity of air, although I am not yet convinced but that such a burner may be employed to advantage with little, if any, alteration.

In the use of an indestructible wick of mica, I avoid the very annoying and oftentimes difficult operation of so trimming a lamp-wick that it shall give out a regularly-formed flame, as, in the employment of my wick, the proper shape, having been once attained, remains in such a state without further care for an indefinite length of time.

I also effect a saving in the present cost of lamp-wicks, as well as the trouble of inserting the same within the lamp-wick tube.

The mechanical appliances necessary to elevate or depress the mica wick will be a matter of separate consideration; but, as the only movement necessary to be effected is one sufficient to change it from a low to a high flame, the act may be accomplished by an outer tube, after the manner now practiced in "fluid" night-lamps, so called.

For packed lamps, and, perhaps, for some others, a fibrous or woven material may be secured to the lower end of the mica.

*Claim.*

I claim—

A lamp-wick as composed of mica, for purposes hereinbefore stated.

DANIEL T. ROBINSON.

Witnesses:
FRED. CURTIS,
EDWARD GRIFFITH.